R. I. COLVIN.
Seed-Planter.
No. 7,680.
Patented Oct. 1, 1850.
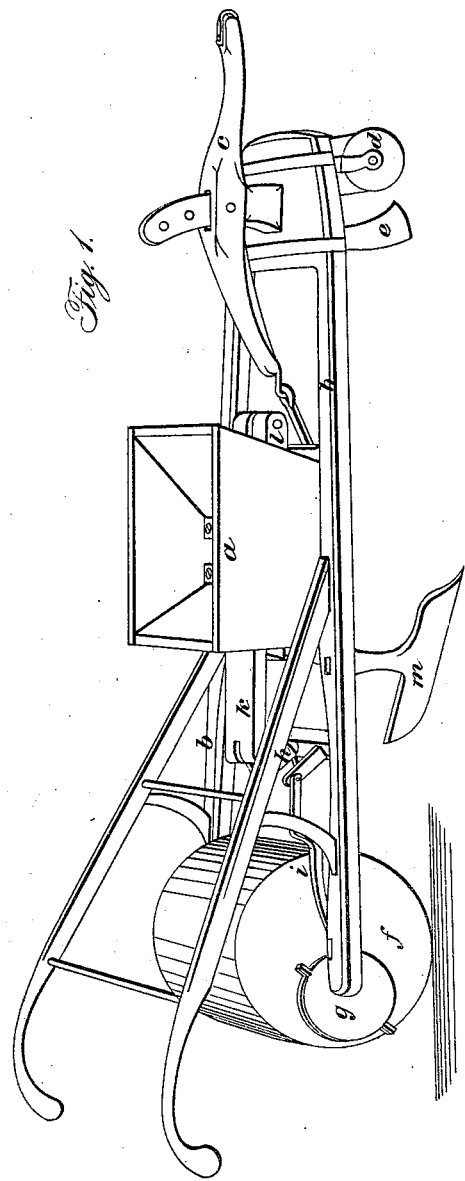
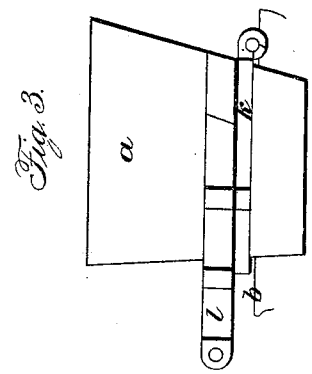
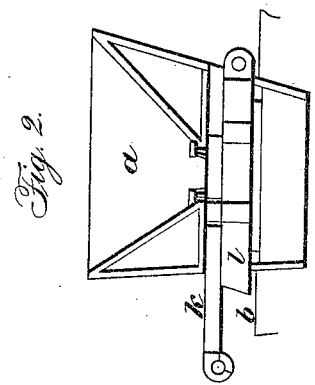

UNITED STATES PATENT OFFICE.

ROBT. I. COLVIN, OF LANCASTER, PENNSYLVANIA.

IMPROVEMENT IN SLIDES OF SEED-PLANTERS.

Specification forming part of Letters Patent No. 7,680, dated October 1, 1850.

*To all whom it may concern:*

Be it known that I, ROBERT I. COLVIN, of Lancaster, in the county of Lancaster and State of Pennsylvania, have invented certain Improvements in Seed-Planters; and I do hereby declare that the following is a full, clear, and exact description of the principle or character which distinguishes them from all other things before known, and of the usual manner of making, modifying, and using the same, reference being had to the accompanying drawings, of which—

Figure 1 is a general view; Fig. 2, a section of the hopper and slides as arranged for drilling, and Fig. 3 the same arranged for planting.

As corn and other seed planters have come into such general use, it is desirable to have one which can be easily varied to suit the circumstances of the field in which it is employed. For instance, it frequently happens that in a field which is well adapted to cross-plowing, and in which it is best to plant the corn in hills equidistant in both directions, there are some parts in which cross-plowing cannot be performed, and consequently it is best to plant the corn in rows or drills. For these and other reasons it is convenient to have a machine which can be readily adapted to one mode or the other, as occasion may require.

The construction is as follows: The hopper *a* is supported on a suitable frame, *b*, having handles in the rear, and an adjustable beam, *c*, to which the horse is attached. At the front end is the roller *d*, to prevent the tooth *e*, which immediately follows it, from entering too deep in the ground. At the after end the large roller *f* runs in journals in the frame *b*, and has on its axis an eccentric, *g*, which works the rocking levers *h* by the rod *i*, which is adjustable. The working or upper slide, *k*, is jointed to the lever *h*, and by it is moved to and fro as the roller *f* revolves. The under slide, *l*, is stationary, and has two holes which coincide with the single hole in the slide *k* at the extremities of its motion. At the lower end of the hopper *a*, on its back and forward edges, are two brushes, which rub on the upper slide as it moves under them. The slides, when thus arranged, drop the seed twice in each revolution of the roller *f*. The hole in the slide *k*, receiving a certain quantity of seed, passes under the brush (which removes the surplus) and carries the seed till it comes to one of the holes in the slide *l*, through which the seed is dropped, and the slide, returning, receives another supply, which it drops in like manner through the other hole in the slide *l*, thus dropping the seed in rows at regular intervals.

To adapt the machine to planting seed in hills at equal distances each way, it is only necessary to take out the slides and reverse them, placing the slide *l* uppermost and attaching it to the lever *h*. One of its holes only then receives the seed and conveys it to the hole in the slide *k*, through which it drops, planting the corn at twice the former distance, or once during each revolution of the roller *f*. The ground is opened by the tooth *e*, and after the seed is dropped in the furrow the earth is closed over it by the two mold-boards *m*, fixed to the frame on each side.

Having thus fully described my improved seed-planter, what I claim as new therein, and which I desire to secure by Letters Patent, is—

The combination of the reversing-slides *k* and *l* with each other and the hopper, by which the machine can be readily adapted to different varieties of planting, in the manner and for the purposes set forth.

ROBT. I. COLVIN.

Witnesses:
 WM. FRICK,
 SAML. H. WALKER.